United States Patent Office 3,453,285
Patented July 1, 1969

3,453,285
TETRAZOLYL ALKANOIC ACIDS
Shin Hayao, Elkhart, Ind., assignor to Miles Laboratories,
Inc., Elkhart, Ind., a corporation of Indiana
No Drawing. Continuation-in-part of application Ser. No.
513,599, Dec. 13, 1965. This application Nov. 29, 1967,
Ser. No. 686,696
Int. Cl. C07d 55/56
U.S. Cl. 260—308                        11 Claims

ABSTRACT OF THE DISCLOSURE

A series of ω-(5-substituted-2-tetrazolyl)alkanoic acids that are useful as anti-inflammatory agents, prepared by base catalyzed alkylation of a corresponding 5-substituted tetrazole with a ω-haloalkanoic acid ester or an ω-halonitrile, followed by hydrolysis.

---

This application is a continuation-in-part of co-pending application Ser. No. 513,599 filed Dec. 13, 1965, and now abandoned.

This invention relates to a series of novel ω-(5-substituted-2-tetrazolyl)alkanoic acids.

The compounds of this invention can be described as 5-substituted 2-tetrazolylalkanoic acids in which the substituent at the 5-position of the tetrazole ring may be aryl or substituted aryl.

The compounds of this invention can be depicted by means of the following structural formula:

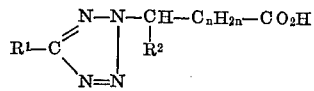

in which $R^1$ is an aryl radical, a halo-substituted aryl radical or an alkoxy substituted aryl radical, $R^2$ is hydrogen, an alkyl radical, such as a lower alkyl, an aryl radical, a halo or alkoxy substituted aryl radical, pyridyl or thienyl and $n$ is 0, 1, 2 or 3.

Illustrative of the aryl radicals represented by $R^1$ and $R^2$ are phenyl and substituted phenyl, such as phenyl substituted with halogen atoms, for example chlorophenyl and dichlorophenyl and phenyl substituted with lower alkoxy radicals such as p-methoxyphenyl.

$R^2$ may be an alkyl radical, such as a lower alkyl radical, for example, one containing up to about 8 carbon atoms, or any of the aryl radicals described above.

The compounds of this invention can be readily prepared by base catalyzed alkylation of the corresponding 5-substituted tetrazole using as alkylating agent a compound which will substitute the tetrazole at the 2-position with the desired carboxylic acid side chain or a precursor thereof. For example, an ω-halo ester can be used to produce the ester corresponding to the desired tetrazolyl alkanoic acid. The ester can then be hydrolyzed with acid or saponified with base and acidified to give the desired alkanoic acid. Another acid precursor which can be used is an ω-halonitrile, the use of which results in the formation of a nitrile corresponding to the desired alkanoic acid. Acid hydrolysis of the nitrile or basic hydrolysis followed by acidification results in production of the desired alkanoic acid. For the synthesis of tetrazolylpropionic acids a particularly useful alkylating agent is β-propiolactone.

The preparation of the compounds of this invention is illustrated in the following series of equations where the acid precursor is an ester:

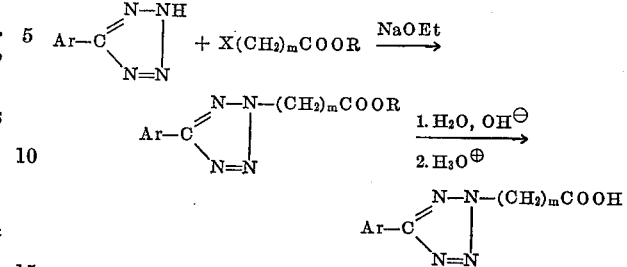

where Ar is aryl, R is lower alkyl and $m$ is 1, 2, 3 or 4.

In the case where the acid precursor is a nitrile the preparation may be illustrated as follows:

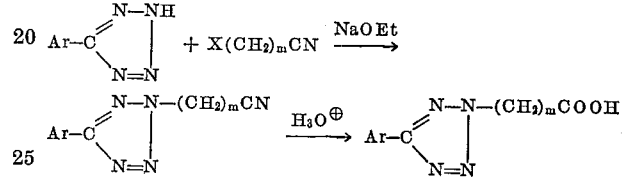

The use of β-propiolactone as an alkylating agent may be illustrated as follows:

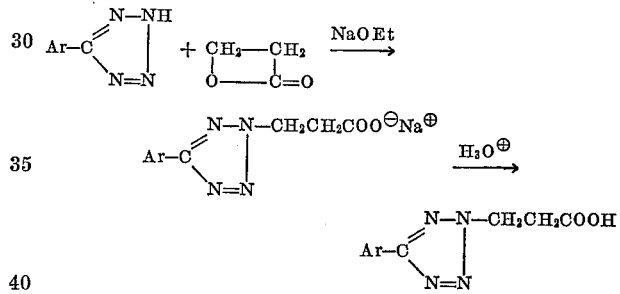

The compounds prepared by means of the above described procedures are useful as anti-inflammatory agents. They may be used in the form of the free acid or appropriate pharmacologically acceptable non-toxic soluble salts thereof may be prepared by methods known to the art.

Suitable medications may be prepared with one or more of the compounds of this invention as an active ingredient using fillers, carriers, extenders, and excipients generally used in pharmaceutical formulations. The active ingredient may be in the form of the free acids and is preferably in the form of the pharmacologically acceptable non-toxic soluble salts thereof. Medications may be prepared in solid or liquid states as tablets, capsules, suspensions and similar dosage forms suitable for oral, intraperitoneal and other convenient means of administration. The active ingredients may be mixed with common diluents or tableting adjuncts such as cellulose powder, cornstarch, lactose, talc and such, according to accepted manufacturing practices. Unit dosages of active ingredient in the medication may be varied so that an adequate amount is present to provide the desired therapeutic results without untoward side effects and to permit satisfactory variations in dosages administered. These medications are preferably prepared according to accepted pharmaceutical practices.

Anti-inflammatory activity was observed when medications including compounds of this invention as an active ingredient were administered orally to randomly selected groups of male rats weighing between 260 and 400 gms. The active ingredients were evaluated substantially according to a procedure in which pleural effusion was elicited by intrapleural administration of Evans Blue and Carrageenin (5 ml. of solution of 0.075% Evans Blue—0.025% Carrageenin). The anti-inflammatory medication was given orally 1 hour before the intrapleural administration of the solution. At 6 hours the animals were sacrificed and the exudate measured.

Groups of seven animals were used for each evaluation. With a uniform oral dose of 127.6 mg./kg. of active ingredient a reduction between about 24.8% and 36.8% was observed in the volume of pleural exudate.

Toxicity of the active ingredients was determined by intraperitoneal administration in mice of the active ingredient. $LD_{50}$'s between 316 mg./kg. and 1000 mg./kg. were observed for these compounds.

This invention will be better understood by reference to the following examples which illustrate but do not limit the scope of the invention.

EXAMPLE 1

5-phenyl-2-tetrazolylacetic acid (a) Ethyl 5-phenyl-2-tetrazolylacetate.—5-phenyltetrazole (14.6 g., 0.1 mole) was added to a solution of sodium ethoxide (from 2.3 g., 0.1 g.-atom of sodium) in 200 ml. of anhydrous ethanol and the solution was refluxed for 30 minutes. Then ethyl chloroacetate (12.3 g., 0.1 mole) was added to the solution and the mixture was refluxed for 20 hours. The solvent was removed in vacuo and the solid residue was treated with water and extracted with chloroform. The extract was dried and concentrated in vacuo to leave an oil which solidified on cooling. The solid was recrystallized from aqueous methanol, yield 15.8 g. (68.2%).

Analysis.—Calcd. for $C_{11}H_{12}N_4O_2$: N, 24.14. Found: N, 24.25.

(b) 5-phenyl-2-tetrazolylacetic acid.—Ethyl 5-phenyl-2-tetrazolylacetate (15.5 g., 0.067 mole) was suspended in dilute sodium hydroxide solution with a small amount of methanol. The mixture was refluxed for one hour, filtered and cooled to give a solid which was collected and recrystallized from aqueous methanol-ether, M.P.>250° C., yield 9.0 g. (59%).

Analysis.—Calcd. for $C_9H_7N_4O_2Na$: N, 24.78; N.E. 226. Found: N, 24.89; N.E. 224.5.

EXAMPLE 2

3-(5-phenyl-2-tetrazolyl)propionic acid 5-phenyltetrazole (13.3 g., 0.091 mole) was added to a solution of sodium ethoxide (from 2.1 g., 0.091 g.-atom of sodium) in 150 ml. of anhydrous ethanol and the solution was heated under reflux for 30 minutes. Then 6.6 g. (0.091 mole) of β-propiolactone was added dropwise to the solution to give a solid. The suspension was stirred at room temperature for an hour and the solvent was removed in vacuo to give a solid residue which was dissolved in water and treated with dilute hydrochloric acid to obtain the free acid. The solid acid was recrystallized from aqueous methanol, M.P. 127°–128° C. yield 14.0 g. (70.5%).

Analysis.—Calcd. for $C_{10}H_{10}N_4O_2$: N, 25.69. Found: N, 25.98.

The above acid (14.0 g., 0.064 mole) and 2.7 g. of sodium hydroxide were dissolved in hot aqueous methanol, filtered and diluted with ether to give the sodium salt which was recrystallized from methanol-ether, M.P. 239°–240° C. (dec.), yield 7.0 g. (45.6%).

Analysis.—Calcd. for $C_{10}H_9N_4O_2Na$: N, 23.33; N.E. 240. Found: N, 23.46; N.E. 245.9.

EXAMPLE 3

4-(5-phenyl-2-tetrazolyl)butyric acid 5-phenyltetrazole (19.0 g., 0.129 mole) was added to a solution of sodium ethoxide (from 3.0 g., 0.129 g.-atom of sodium) in 150 ml. of anhydrous ethanol and the solution was heated under reflux for 30 minutes. 4-bromobutyronitrile (19.2 g., 0.129 mole) was added and the solution was heated under reflux for 20 hours. The solvent was removed in vacuo to leave a liquid residue which was hydrolyzed by heating at 150°–160° C. for 30 minutes and at 190° C. for 30 minutes (wax bath temperature in 100 ml. of 75% sulfuric acid containing 1 g. of sodium chloride. The cooled reaction mixture was added to 500 g. of ice and the resulting precipitate was collected, dissolved in dilute sodium hydroxide solution and reprecipitated with dilute hydrochloric acid. The solid was recrystallized from aqueous methanol to give a pure acid of M.P. 70°–81° C. yield 14.0 g. (46.8%).

Analysis.—Calcd. for $C_{11}H_{12}N_4O_2$: N, 24.14. Found: N, 24.28.

The above acid (13.5 g., 0.058 mole) and potassium hydroxide (3.5 g., 0.058 mole) were dissolved in ethanol, filtered and diluted with ether to give a potassium salt which was recrystallized from ethanol-ether, M.P. 250°–250.5° C. (dec.), yield 9.4 g. (60.2%).

Analysis.—Calcd. for $C_{11}H_{11}N_4O_2K$: N, 20.74; N.E. 270. Found: N, 20.81; N.E. 277.6.

EXAMPLE 4

2-(5-phenyl-2-tetrazolyl)propionic acid

To a solution of 5-phenyltetrazole (29.2 g., 0.2 mole) and sodium (4.6 g., 0.2 g.-atoms) in 250 ml. of absolute ethanol was added ethyl 2-bromopropionate (36.2 g., 0.2 mole) in 50 ml. of absolute ethanol during 15 minutes to give a slightly opaque solution which was refluxed with stirring for 15 hours. The inorganic salt was removed and the solution was concentrated in vacuo to give a mash which was triturated with aqueous ammonia; the resulting semi-solid was extracted with chloroform. The aqueous ammonia layer was acidified to give 3.8 g. of 5-phenyltetrazole (M.P. 212°–214° C. dec.), 13% recovery. The chloroform solution was dried and the solvent was removed in vacuo to give a pale yellow liquid (an ester) which was dissolved in a mixture of 100 ml. methanol and 50 ml. 18% hydrochloric acid and refluxed for 2.5 hours. The alcohol was removed in vacuo and the residue was treated with dilute sodium hydroxide solution to give a light tan sodium salt of M.P. 296°–297° C. (dec.), yield 37.7 g. (78.5%). It was recrystallized from aqueous 2-propanol-ether to give a colorless crystalline solid of M.P. 292° C. (dec.), yield 33.5 g. A sample was dried at 250° C. (0.1 mm.) for one hour. The sample was dried at 100° C. (0.1 mm.) for 2 hours.

Analysis.—Calcd. for $C_{10}H_9N_4O_2Na$: N, 23.3; N.E. 240. Found: N, 23.1; N.E. 247.

The above sodium salt was suspended in water and made acidic with dilute hydrochloric acid to give a sticky syrup which soon solidified on scratching. The free acid was recrystallized from aqueous methanol to give a colorless solid of M.P. 144°–146° C.

$\nu_{max.}^{CHCl_3}$: 1745 (acid C=O), 1535 (tetrazole ring) 690 cm.$^{-1}$ (mono-substituted benzene)

Analysis.—Calcd. for $C_{10}H_{10}N_4O_2$: C, 55.0; H, 4.59; N, 25.7. Found: C, 55.0; H, 4.56; N, 25.9.

EXAMPLE 5

2-(5-phenyl-2-tetrazolyl)phenylacetic acid

Sodium methoxide (8.1 g., 0.15 mole) was added to 180 ml. of n-butanol. 5-phenyltetrazole (21.9 g., 0.15 mole)

was added to the solution and heated at 100°–110° C. for 30 minutes. Ethyl α-chlorophenylacetate (29.8 g., 0.15 mole) was added and the solution was refluxed for 18 hours with stirring. The reaction mixture was filtered and concentrated in vacuo to leave an oil (ester C=O at 1775 cm.$^{-1}$). The oil was heated in a mixture of dilute sodium hydroxide solution (20%) and ethanol for 2 hours. The solution was acidified to give a sticky solid which solidified completely when water was added to the mixture. The solid was recrystallized from aqueous methanol to give a pure acid of M.P. 171°–173° C. yield 23.5 g. (56.0%).

*Analysis.*—Calcd. for $C_{15}H_{12}N_4O_2$: N, 20.0. Found: N, 20.0.

The above acid (20.0 g., 0.071 mole) and 5 g. of potassium hydroxide were dissolved in ethanol. The solution was filtered and ether was added to give a salt of M.P. 177.5°–179.5° C. (dec.), yield 8.5 g. (37.7%).

*Analysis.*—Calcd. for $C_{15}H_{11}N_4O_2K$: N, 17.6. Found: N, 17.6.

EXAMPLE 6

5-(5-phenyl-2-tetrazolyl)pentanoic acid

To a suspension of 5-phenyltetrazole (29.2 g., 0.2 mole) in 50 ml. of absolute ethanol was added 4.6 g. (0.2 g.-atoms) of sodium in 150 ml. of absolute ethanol to give a slightly opaque solution. 5-bromovaleronitrile (32.4 g., 0.2 mole) in 50 ml. of ethanol was added to the above solution and refluxed for 12 hours. The inorganic salt was removed and the ethanolic solution was concentrated in vacuo to give an oil which was extracted with chloroform and with ethyl acetate. The combined extracts were dried and the solvent was removed in vacuo to leave a colorless oil. The oil was hydrolyzed in a mixture of 100 ml. ethanol and 100 ml. of 20% sodium hydroxide solution by refluxing for 4 hours. The alcohol was removed in vacuo and the alkaline solution was acidified with dilute hydrochloric acid to give an oil which solidified soon on scratching. The solid was collected by suction, washed with water and dried in air, yield 44.9 g. (91.2%). It was recrystallized from aqueous ethanol to give a crystalline solid of M.P. 89°–90° C., yield 36.2 g. The above acid was twice recrystallized from acetone-Skelly B. to give shiny plates of M.P. 92°–93° C.

$\nu_{max.}^{CHCl_3}$: 1715 (acid C=O), 1530 (tetrazole ring), 1470 and 1450 cm.$^{-1}$ (—CH$_2$CO—)

*Analysis.*—Calcd. for $C_{12}H_{14}N_4O_2$: C, 58.5; H, 5.61; N, 22.8; N.E. 246. Found: C, 58.7; H, 5.70; N, 22.7, 23.0; N.E. 249.8.

EXAMPLE 7

3-(5-p-chlorophenyl-2-tetrazolyl)propionic acid 5-(4-chlorophenyl)tetrazole (27.1 g., 0.15 mole) was added to a solution of sodium (3.5 g., 0.15 g.-atom) in 150 ml. of anhydrous ethanol and the solution was heated under reflux for half an hour. β-propiolactone (13 g., 0.18 mole) was added dropwise and the mixture was stirred at room temperature for 2 hours and heated at the boiling point for half an hour. The solvent was removed in vacuo and the solid concentrate was dissolved in water and acidified with dilute HCl. The solid that formed was collected and recrystallized three times from an aqueous alcohol solution M.P. 151.5°–152.0° C., yield 21.7 g. (57.3%).

*Analysis.*—Calcd. for $C_{10}H_9ClN_4O_2$: N, 22.18. Found: N, 22.06.

The free acid (21.7 g., 0.086 mole) and 5.3 g. of KOH were dissolved in hot aqueous ethanol, filtered, diluted with ether and cooled. The solid was collected and recrystallized from a methanol-ether solution. The potassium salt melted at 241.5°–243.5° C. (dec.), yield 10.5 g. (42%).

*Analysis.*—Calcd. for $C_{10}H_8ClN_4O_2K$: N, 19.3; N.E. 290.5. Found: N, 19.3; N.E. 290.0.

EXAMPLE 8

3-[5-(3,4-dichlorophenyl)-2-tetrazolyl]propionic acid (a) Ethyl 3-[5-(3,4-dichlorophenyl)-2-tetrazolyl]propionate.—To a solution of 5-(3,4-dichlorophenyl)tetrazole (21.5 g., 0.1 mole) in 150 ml. of absolute ethanol containing 2.3 g. (0.1 g.-atom) of sodium was added a solution of ethyl 3-bromopropionate (18.1 g., 0.1 mole) in 50 ml. of absolute ethanol during 10 minutes. The resulting solution was refluxed with stirring for 20 hours. The solution was filtered to remove sodium bromide and concentrated in vacuo to leave an oil. The oil was heated in aqueous methanolic hydrogen chloride for 8 hours and the clear solution gave a light pink solid on cooling, yield 23.9 g., M.P. 116°–120° C. (no hydrolysis). It was recrystallized from aqueous ethanol to give a colorless crystalline solid of M.P. 121°–122° C., yield 18.9 g.

$\nu_{max.}^{CHCl_3}$: 1745 (ester C=O), 1445 (—CH$_2$CO—)

*Analysis.*—Calcd. for $C_{12}H_{12}Cl_2N_4O_2$: N, 17.8. Found: N, 18.2.

(b) 3 - [5-(3,4-dichlorophenyl)-2-tetrazolyl]propionic acid.—The above ester (18.2 g.) was refluxed overnight in a mixture of glacial acetic acid (80 ml.) and concentrated hydrochloric acid (50 ml.). The solvent was removed in vacuo to leave a brown solid which was treated with aqueous sodium hydroxide to give at first a dark solution (not quite completely clear). Then sodium salt soon came out. The salt was collected by suction, washed with water and with acetone, M.P. 242°–244° C. (dec.), yield 21.4 g. The salt was twice recrystallized from methanol-ether (charcoal) to give shiny plates of M.P. 241°–242° C. (dec.), yield 3.1 g.

*Analysis.*—Calcd. for $C_{10}H_7Cl_2N_4O_2Na$: N, 18.2. Found: N, 18.3.

The filtrate was concentrated in vacuo to leave a solid which was recrystallized from methanol-ether to give a solid of M.P. 241°–243° C. (dec.), yield 6.7 g.

EXAMPLE 9

3-[5-(3,4-dimethoxyphenyl)-2-tetrazolyl]propionic acid 5-(3,4-dimethoxyphenyl)tetrazole (20.6 g., 0.1 mole) was added to a solution of sodium (2.3 g., 0.1 g. - atom) in 150 ml. of anhydrous ethanol and the solution was heated under reflux for 1 hour. β-propiolactone (10.8 g., 0.15 mole) was added dropwise and the solution was stirred at room temperature for 2 hours and then heated under reflux for 1 hour. The solvent was removed in vacuo and the concentrate was dissolved in water, filtered and acidified with dilute HCl to form a viscous oil. The oil was separated from the solution and dissolved in hot aqueous ethanol with 6 g. of KOH. The solution was filtered and diluted with ether to form a solid salt. The salt was collected, dissolved in water and acidified with dilute HCl to form a solid, which was recrystallized from an aqueous ethanol solution, M.P. 146.0°–146.5° C., yield 7.5 g. (27%).

*Analysis.*—Calcd. for $C_{12}H_{14}N_4O_4$: N, 20.1. Found: N, 20.1.

The free acid (7 g., 0.025 mole) and 2 g. of KOH were dissolved in hot aqueous ethanol, filtered, diluted with ether and cooled. The solid salt was collected and recrystallized once from an aqueous ethanol-ether solution and once from a methanol-ether solution, M.P. 231°–233° C. (dec.), yield 5.9 g. (69.6%).

Analysis.—Calcd. for $C_{12}H_{13}N_4O_4K$: N, 17.7. Found: N, 17.6.

EXAMPLE 10

3-[5-(2,6-dichlorophenyl)-2-tetrazolyl]propionic acid 5-(2,6-dichlorophenyl)tetrazole (25 g., 0.116 mole) was added to a solution of sodium (2.6 g., 0.116 mole) in 150 ml. of anhydrous ethanol and the solution was heated under reflux for half an hour. Ethyl 3-bromopropionate (21.1 g., 0.116 mole) was added and the solution was heated under reflux with stirring for 18 hours. The mixture was filtered and the filtrate was concentrated in vacuo, dissolved in chloroform, washed with dilute NaHCO$_3$, dried (MgSO$_4$) and concentrated in vacuo to form an oil.

$\nu_{max.}^{CHCl_3}$: 1740 cm.$^{-1}$ (ester carbonyl)

The oil was suspended in 50 ml. of conc. HCl and 80 ml. of acetic acid and the solution was heated under reflux for 20 hours. This solution was concentrated in vacuo to a glass-like oil. The oil was chromatographed on a magnesium silicate column, using ethyl acetate as eluant to give 2 fractions. The first fraction (0.5 g.) was the starting ester (1740 cm.$^{-1}$, ester carbonyl). The second fraction (13.7 g.) was dissolved in chloroform and extracted with dilute Na$_2$CO$_3$. The extracts were acidified with dilute HCl and the free acid was extracted with ether. The ether was removed in vacuo and the concentrate crystallized from methanol and recrystallized from benzene, M.P. 136.5°–137.5° C. (dec.). Yield: 2.4 g.

$\nu_{max.}^{CHCl_3}$: 1720 cm.$^{-1}$ (acid carbonyl) and broad bands at 3000–3500 cm.$^{-1}$ Analysis.—Calcd. for $C_{10}H_8Cl_2N_4O_2$: C, 41.82; H, 2.81; N, 19.50. Found: C, 42.00; H, 3.02; N, 19.30.

In summary this invention provides a series of novel ω-(5-substituted-2-tetrazolyl)alkanoic acids having anti-inflammatory activity which are exemplified by the various compounds more particularly described in the foregoing examples. The structural formulae of the compound thus exemplified are shown in Table 1.

TABLE 1

| Example No.: | Chemical Name and Structure | Melting Point, ° C. | Formula | Calculated | | | Found | | |
|---|---|---|---|---|---|---|---|---|---|
| | | | | N | N.E. | C | H | N | N.E. | C | H |
| 1 | 5-phenyl-2-tetrazolylacetic acid sodium salt 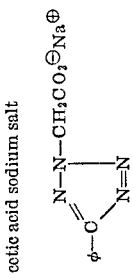 | 250 | $C_9H_7N_4O_2Na$ | 24.78 | 226 | | | 24.89 | 224.5 | | |
| 2 | 3-(5-phenyl-2-tetrazolyl)propionic acid sodium salt  | 239–240 (dec.) | $C_{10}H_9N_4O_2Na$ | 23.33 | 240 | | | 23.46 | 245.0 | | |
| 3 | 4-(5-phenyl-2-tetrazolyl)butyric acid potassium salt  | 250–250.5 (dec.) | $C_{11}H_{11}N_4O_2K$ | 20.74 | 270 | | | 20.81 | 277.6 | | |
| 4 | 2-(5-phenyl-2-tetrazolyl)propionic acid 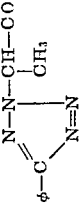 | 144–146 | $C_{10}H_{10}N_4O_2$ | 25.7 | | 55.0 | 4.59 | 25.9 | | 55.0 | 4.56 |

TABLE 1—Continued

| Example No.: | Chemical Name and Structure | Melting Point, °C. | Formula | Analysis |||||||
|---|---|---|---|---|---|---|---|---|---|---|
| | | | | Calculated |||| Found ||||
| | | | | N | N.E. | C | H | N | N.E. | C | H |
| 5 | 2-(5-phenyl-2-tetrazolyl)phenylacetic acid potassium salt | 177.5–179.5 (dec.) | $C_{15}H_{11}N_4O_2K$ | 17.6 | | | | 17.6 | | | |
| 6 | 5-(5-phenyl-2-tetrazolyl)pentanoic acid | 92–93 | $C_{12}H_{14}N_4O_2$ | 22.8 | 246 | 58.5 | 5.61 | 22.7, 23.0 | 249.8 | 58.7 | 5.70 |
| 7 | 3-[5-(p-chlorophenyl-2-tetrazolyl)-propionic acid potassium salt | 241.5–243.5 (dec.) | $C_{10}H_8ClN_4O_2K$ | 19.3 | 290.5 | | | 19.3 | 290.0 | | |
| 8 | 3-[5-(3,4-dichlorophenyl)-2-tetrazolyl]propionic acid sodium salt | 241–243 (dec.) | $C_{10}H_7Cl_2N_4O_2Na$ | 18.2 | | | | 18.3 | | | |
| 9 | 3-[5-(3,4-dimethoxyphenyl)-2-tetrazolyl]propionic acid | 231–233 (dec.) | $C_{12}H_{14}N_4O_4$ | 20.1 | | | | 20.1 | | | |
| 10 | 3-[5-(2,6-dichlorophenyl)-2-tetrazolyl]propionic acid | 186.5–187.5 | $C_{10}H_8Cl_2N_4O_2$ | 19.50 | | 41.82 | 2.81 | 19.30 | | 42.00 | 3.02 |

What is claimed is:
1. A compound selected from the group consisting of compounds of the formula:

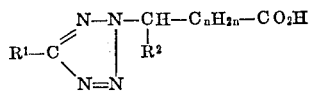

in which $R^1$ is a member selected from the group consisting of phenyl, halo-substituted phenyl and lower alkoxy-substituted phenyl, $R^2$ is a member selected from the group consisting of hydrogen, lower alkyl, phenyl, halo-substituted phenyl and lower alkoxy-substituted phenyl and $n$ is in integer between 0 and 3 and pharmacologically acceptable non-toxic salts thereof.
2. 5-phenyl-2-tetrazolylacetic acid.
3. 3-(5-phenyl-2-tetrazolyl)-propionic acid.
4. 4-(5-phenyl-2-tetrazolyl)-butyric acid.
5. 2-(5-phenyl-2-tetrazolyl)-propionic acid.
6. 2-(5-phenyl-2-tetrazolyl)-phenylacetic acid.
7. 5-(5-phenyl-2-tetrazolyl)-pentanoic acid.
8. 3-(5-p-chlorophenyl-2-tetrazolyl)propionic acid.
9. 3 - [5 - (3,4 - dichlorophenyl) - 2 - tetrazolyl]propionic acid.
10. 3 - [5 - (3,4 - dimethoxyphenyl) - 2 - tetrazolyl]propionic acid.
11. 3 - [5 - (2,6 - dichlorophenyl) - 2 - tetrazolyl]propionic acid.

References Cited

Jacobson et al.: J. Org. Chem., vol. 21, pp. 311–315 (1956).

ALTON D. ROLLINS, *Primary Examiner.*

U.S. Cl. X.R.

260—295; 424—269